Nov. 15, 1949 C. ROBBINS, II 2,487,830
SCREEN PATCH AND METHOD OF PRODUCING SAME
Filed Oct. 5, 1945
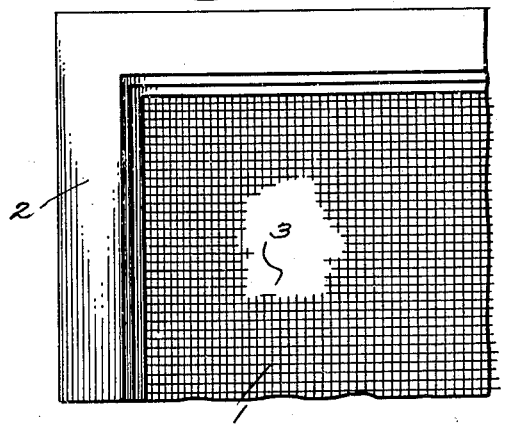
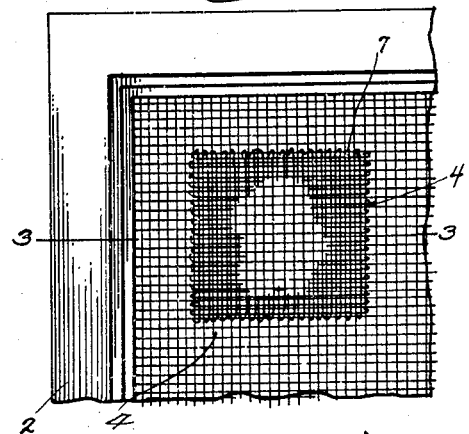
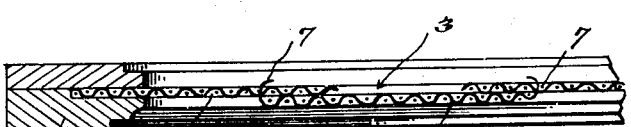
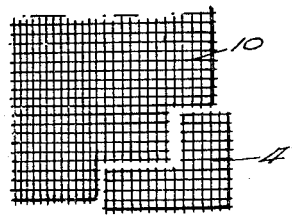
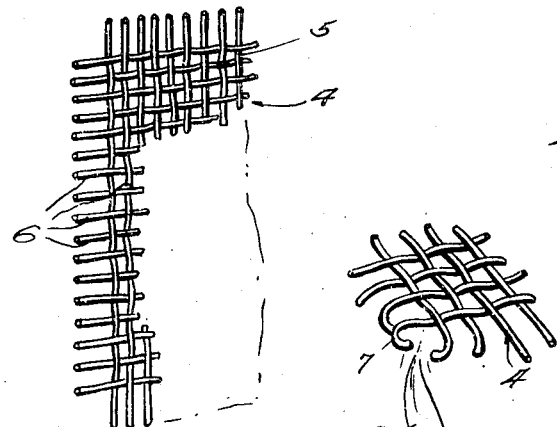
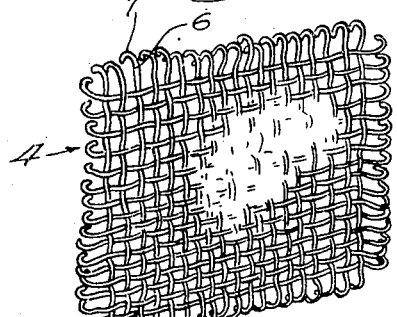
INVENTOR.
Chandler Robbins II
BY
William F. Desmond
ATTORNEY Patented Nov. 15, 1949

2,487,830

UNITED STATES PATENT OFFICE 2,487,830

SCREEN PATCH AND METHOD OF PRODUCING SAME

Chandler Robbins, II, Alexandria, Va.

Application October 5, 1945, Serial No. 620,618

9 Claims. (Cl. 28—73)

(Granted under the act of March 3, 1883, as amended April 30, 1928; 370 O. G. 757)

The invention described herein, if patented, may be manufactured and used by or for the Government for governmental purposes, without the payment to me of any royalty thereon.

This invention relates to a screen patch and method of producing same, and more particularly to a screen patch of thermoplastic material and its method of production.

An object of this invention is to provide an improved patch for repairing wire, plastic, or fabric screens, and the like, the patch being made of woven strands of a thermoplastic material, and the ends of the strands forming screen-engaging hooks.

A further object of this invention is to provide an improved patch for repairing screens or netting, the patch being of limited area and made of woven strands of a material having such property that the free ends of the strands will curl under the application of heat to form screen-engaging hooks.

Another object of this invention is to provide a self-attaching patch for repairing screen material, the patch being made entirely of nylon filaments having screen engaging hooks.

It is a further object of this invention to provide a method of producing a screen patch including the steps of weaving threads of material to form a patch with the threads having free ends and bending the free ends solely by the application of heat to form hooks.

Various types of patches have been suggested but they are all of metallic material and provide complex screen-engaging elements, usually specially pre-formed hooks or hooks which must be manually bent in back of the screen. Also the suggested patches are prefabricated to a definite size and shape. This invention provides a method for patching breaks in screens with the use of a minimum amount of patching material and it is therefore a further object of this invention to provide a method of forming screen patches using a thermoplastic netting, cutting a patch therefrom in the size and shape required, and applying heat around the periphery of the patch to curl the free ends of the thermoplastic threads to form hooks.

Other objects and advantages of the present invention will appear in the following detailed description and be particularly pointed out in the appended claims, reference being had to the accompanying drawing forming part of this specification, and in which:

Figure 1 is a front elevational view of a portion of a screen showing a hole therein;

Figure 2 is a front elevational view of the screen of Figure 1 showing the patch of this invention in position covering the hole;

Figure 3 is a sectional view taken on line 3—3 of Figure 2;

Figure 4 is an exploded plan view showing how a patch can be cut from a large sheet of netting or screen material;

Figure 5 is an enlarged detail view showing the construction of the patch;

Figure 6 is a detail view showing one method of applying heat to the periphery of the patch to form the hooks; and Figure 7 is a detail view of the completed patch ready for use.

Referring to the drawing, the conventional screen 1, which may be made of fabric, wire or plastic material, is shown with a frame 2 for mounting purposes. Figure 1 shows a fracture in the screen, illustrated as a hole 3, irregular in shape. It is obvious, however, that breaks in screens can assume any shape, varying from slit-like openings to gaping holes and the patch and method of this invention are adapted for repair of any type of fracture with great ease and with a minimum of patching material. Figure 2 illustrates a patch 4 of square shape affixed to the screen 1 to cover the hole 3 and with its edges in close contact with the screen to seal the hole against the passage of flies, mosquitoes, and other types of insects. For L-shaped slits in screens an L-shaped patch, illustrated as 4' in Figure 4, can be used.

The patch 4 is made by weaving or otherwise forming filaments or strands 5 of a thermoplastic material into a mesh with the free ends 6 of the strands protruding some distance beyond the mesh at the periphery of the patch as shown in Figure 5. The material selected for the patch must be one exhibiting the property of having its ends curl under the application of heat to form substantially rigid hooks. This property in the material is utilized to form the peripheral hooks 7 in the free ends 6.

As shown in Figure 6, heat, for example, in the form of a flame 8 from a match 9, is applied progressively along the periphery of the patch to the free ends 6. As the heat progresses along the periphery of the patch, the free ends 6 of the strands will successively curl in the direction of the heat to form the hooks 7. When a flame is used, it should not be held too closely to the free ends since otherwise the material will tend to fuse. The heat may be applied in other ways, for example, by the use of hot irons or by electrically heated filaments placed near the periphery of the patch. Another method would be to place the patch momentarily on a flat heated plate to curl the protruding ends simultaneously all around the periphery. Or a specially formed heating device can be used to curl all the ends simultaneously.

Among thermoplastic materials which can be used for the filaments or strands forming the screen patch of this invention are monofilaments of nylon, a polymeric amide, and polymerized vinylidene chloride, and in each case the free ends of the filaments will curl to form hooks when heat is applied. In using these synthetic resin materials it was found that the nylon hooks were more rigid than the vinylidene chloride hooks, but the latter were sufficiently rigid for the purpose of affixing to screens. Any material, the free ends of which will curl under the application of heat to form substantially rigid hooks may be used in the screen patches of this invention.

As shown in Figure 4, the patch 4' may be irregular in shape and may be cut out from a large sheet or a roll of screen material or netting 10. After cutting, the exposed free ends of strands at the periphery of patch 4' will be curled to form hooks by the application of heat, as for example by the method illustrated in Figure 6, or by placing the patch on a flat hot plate. If the heat is applied progressively along the periphery, the ends of the strands may bend irregularly as the heat is moved along due primarily to slight variations in the speed and path of movement of the heat source, variations that are apt to occur in the manual application of heat. Thus in the finished patch, the hooks 7 may appear in an irregular line around the periphery with some hooks curled more than others. However, these irregularities in the formation of the hooks 7 are not detrimental. It is merely necessary to place the finished patch against the screen with the approximate center of the patch directly over the fracture. The hooks 7 will be pushed through the screen 1 and fasten themselves in the mesh of the screen 1, thus forming a new portion of screening over the damaged screening. The hooks 7 will become caught in the screen 1 due to the hooks encircling strands of the screen and/or frictionally engaging strands of the screen. If the hooks are irregular, the attachment is nevertheless assured since it is only necessary for some of the hooks 7 to encircle strands of the screen, the remaining hooks tending to hold by friction wherever they contact. The periphery of the patch will be closely held to the screen and the attachment will be such as to resist accidental withdrawal due to wind and other motions to which the repaired screen may be subjected. However, due to the nature of the material of which the patch is made and its flexibility, the patch can be removed manually without difficulty at any time and be reused.

Though the patch has been illustrated as being applied to a screen 1 having a frame 2, it is obvious that the patch of this invention is applicable to any type of screen, screening material, to mosquito netting and the like. Though the patch has been illustrated as being woven, it is apparent that other forms of mesh may be used as long as filaments protrude at the periphery for the formation of hooks.

This invention may be practiced in a number of ways. For example, screen patches of limited area may be marketed prior to forming the hooks, as in the form shown in Figure 5, and the purchaser may form the hooks manually by the application of heat immediately before use. Or if desired, patches of limited area and of different sizes may be completely manufactured before marketing with the hooks formed during one of the steps of manufacture. In the latter method, all the hooks around the periphery of the patch may be simultaneously formed by the uniform application of heat to the periphery of the patch, as for example by momentarily placing the patch on a hot plate or by bringing the patch near a specially formed heating device conforming to the shape of the patch.

While the invention has been described in more or less detail, it is not to be limited thereby, as changes may be made in the form, arrangement and method of construction and equivalents may be substituted, without departing from the spirit and the scope of the invention, the form and method hereinbefore described being merely preferred embodiments thereof.

I claim:

1. A method of making a patch for repairing screens or nets comprising the steps of weaving filaments of thermoplastic heat-curlable material to form a patch of limited area with the filaments having free ends, and bending said free ends solely by the application of heat to form hooks.

2. A method of producing a patch for repairing wire, plastic or fabric screens or nets which comprises forming a patch with filaments of a thermoplastic synthetic resin material and curling the filaments at the periphery of the patch solely by the application of heat to the free ends of said filaments to form substantially rigid hooks.

3. A method of producing a patch for repairing wire, plastic or fabric screen or nets which comprises forming a patch with nylon filaments and curling the free ends of said filaments solely by the application of heat to the peripihery of the patch to form substantially rigid hooks.

4. A method of producing a patch for repairing wire, plastic or fabric screen or nets which comprises forming a patch with polymerized vinylidene chloride filaments and curling the free ends of said filaments solely by the application of heat to the periphery of the patch to form substantially rigid hooks.

5. A method of producing a patch for repairing wire, fabric, or plastic screens or netting which comprises weaving into a mesh of limited area threads of thermoplastic heat-curlable material, cutting a patch from said mesh in the size and shape required with opposite ends of the threads in said patch being free, and curling said free ends solely by the application of heat to said free ends to form hooks at the periphery of said patch.

6. A method of producing a patch for repairing screens which comprises forming a netting of thermoplastic heat-curlable strands, cutting a patch from said netting of the required size and shape with free ends of the thermoplastic strands protruding around the periphery of said patch, said free ends being of sufficient length to curl into the shape of hooks under the application of heat, and curling said free ends solely by the application of heat to the periphery of said patch to form screen-engaging hooks.

7. A repair patch for screens, nets and the like comprising a mesh of flexible filaments of a thermoplastic heat-curlable synthetic resin material, the opposite ends of a plurality of said filaments being curled solely by the application of heat to form hooks integral with and of greater rigidity than said filaments, for engaging strands of the screen or net to be repaired and resisting disengagement therefrom.

8. A repair patch for screens, nets and the like comprising a mesh of flexible filaments of nylon, the opposite ends of a plurality of said filaments being curled solely by the application of heat to form hooks integral with and of greater rigidity than said filaments, for engaging strands of the screen or net to be repaired and resisting disengagement therefrom.

9. A repair patch for screens, nets and the like comprising a mesh of flexible filaments of polymerized vinylidene chloride, the opposite ends of a plurality of said filaments being curled solely by the application of heat to form hooks integral with and of greater rigidity than said filaments, for engaging strands of the screen or net to be repaired and resisting disengagement therefrom.

CHANDLER ROBBINS II.

REFERENCES CITED

The following references are of record in the file of this patent:

UNITED STATES PATENTS

| Number | Name | Date |
|---|---|---|
| 2,272,196 | Gittens | Feb. 10, 1942 |
| 2,283,803 | Gittens | May 19, 1942 |
| 2,355,635 | Dubilier | Aug. 15, 1944 |
| 2,364,404 | Thomas | Dec. 5, 1944 |
| 2,408,422 | Harris | Oct. 1, 1946 |

FOREIGN PATENTS

| Number | Country | Date |
|---|---|---|
| 400,462 | Great Britain | Oct. 7, 1933 |